(12) United States Patent
Jung (10) Patent No.: US 7,777,228 B2
(45) Date of Patent: Aug. 17, 2010

(54) ARRAY SUBSTRATE FOR LIQUID CRYSTAL DISPLAY DEVICE AND METHOD OF FABRICATING THE SAME

(75) Inventor: Ji-Hyun Jung, Ulsan (KR)

(73) Assignee: LG Display Co., Ltd., Seoul (KR)

( * ) Notice: Subject to any disclaimer, the term of this patent is extended or adjusted under 35 U.S.C. 154(b) by 193 days.

(21) Appl. No.: 11/819,499

(22) Filed: Jun. 27, 2007

(65) Prior Publication Data
US 2008/0012017 A1    Jan. 17, 2008

(30) Foreign Application Priority Data
Jun. 28, 2006   (KR) ...................... 10-2006-0058506

(51) Int. Cl.
*H01L 27/14* (2006.01)
(52) U.S. Cl. .......... 257/72; 257/E27.111; 257/E27.131; 257/E27.152; 257/E29.282
(58) Field of Classification Search ................... 257/72, 257/E29.282, E27.111, E27.131, E27.152
See application file for complete search history.

(56) References Cited

U.S. PATENT DOCUMENTS

| 6,760,092 B2 * | 7/2004 | Yoo et al. | 349/187 |
| 6,969,643 B2 * | 11/2005 | Kim | 438/149 |
| 2004/0036816 A1 * | 2/2004 | Yun | 349/43 |

* cited by examiner

*Primary Examiner*—Wael M Fahmy
*Assistant Examiner*—John C Ingham
(74) *Attorney, Agent, or Firm*—Morgan Lewis & Bockius LLP (57) ABSTRACT

An array substrate for a liquid crystal display device comprises a gate line on a substrate having a pixel region; a gate insulating layer on the gate line; a data line crossing the gate line to define the pixel region and formed on the gate insulating layer; a thin film transistor in the pixel region and connected to the gate line and the data line; a passivation layer on the thin film transistor and the data line and having a groove extending along boundary portion of the pixel region and exposing the gate insulating layer; and a pixel electrode in the pixel region and connected to the thin film transistor.

11 Claims, 12 Drawing Sheets

ARRAY SUBSTRATE FOR LIQUID CRYSTAL DISPLAY DEVICE AND METHOD OF FABRICATING THE SAME

The present application claims the benefit of Korean Patent Application No. 2006-0058506 filed in Korea on Jun. 28, 2006, which is hereby incorporated by reference.

BACKGROUND OF THE INVENTION

1. Field of the Invention

The present invention relates to a liquid crystal display (LCD) device and more particularly to an array substrate for the LCD device having no wavy noise problem and shorting defects and a method of fabricating the array substrate.

2. Discussion of the Related Art

Since the LCD device has characteristics of light weight, thinness and low power consumption, the LCD device has been widely used as a substitute for a display device of cathode-ray tube type.

The LCD device uses optical anisotropy and polarization properties of liquid crystal molecules to display images. The liquid crystal molecules have orientation characteristics of arrangement resulting from their thin and long shape. Thus, an arrangement direction of the liquid crystal molecules can be controlled by applying an electrical field to them. Particularly, the LCD device including a thin film transistor (TFT) as a switching element, referred to as an active matrix LCD (AM-LCD) device, has excellent characteristics of high resolution and displaying moving images. Since the LCD device includes the TFT as the switching element, it may be referred to as a TFT-LCD device.

Generally, the LCD device includes an array substrate, where a TFT and a pixel electrode are formed, a color filter substrate, where a color filter layer and a common electrode are formed, and a liquid crystal layer. The array substrate and the color filter layer face and are spaced apart from each other. The liquid crystal layer is interposed therebetween.

Figure 1:
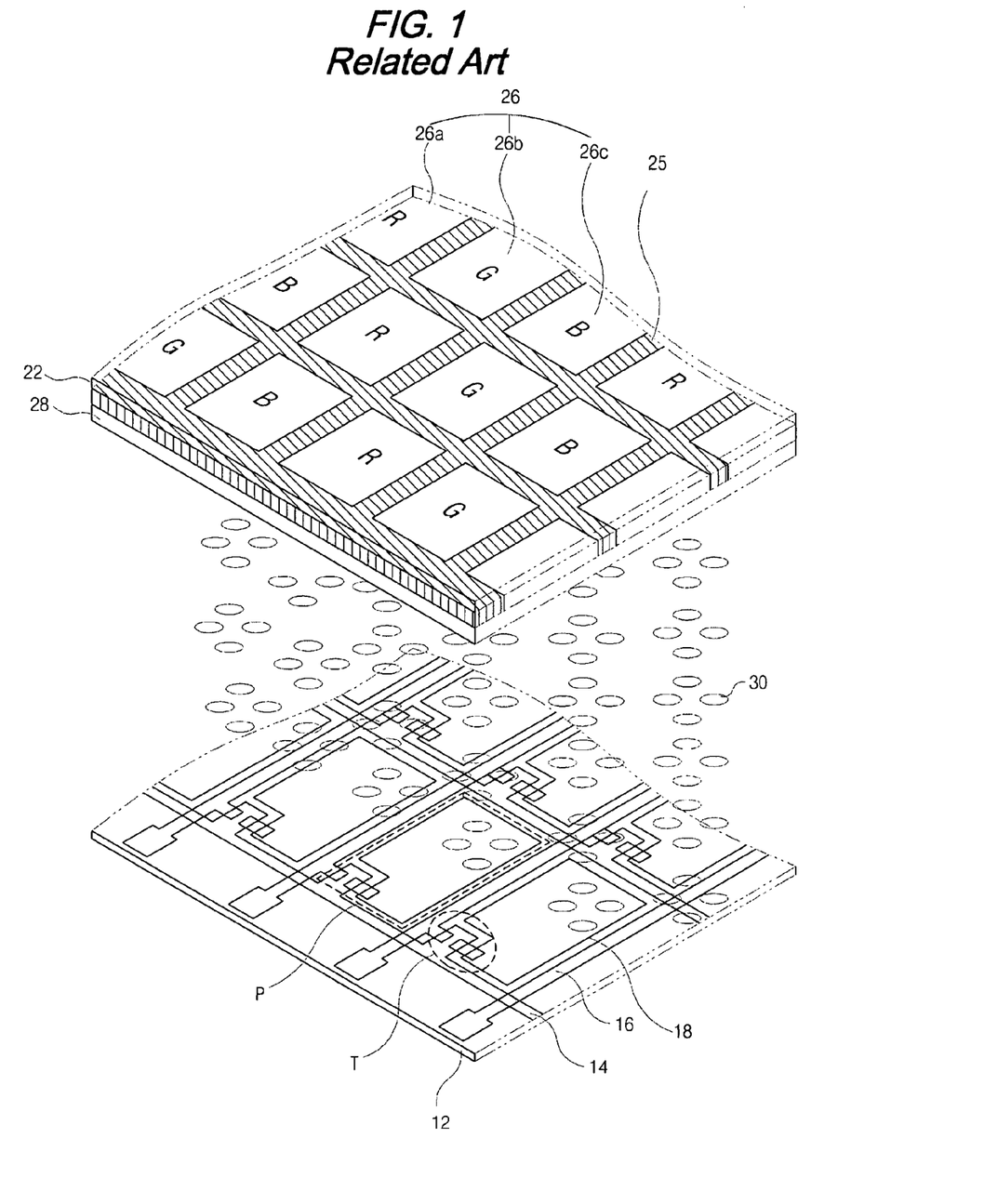
FIG. 1 is an exploded perspective view of a conventional LCD device.

FIG. 1 is an exploded perspective view of a conventional LCD device. As shown in FIG. 1, the LCD device includes first and second substrates 12 and 22, and a liquid crystal layer 30. The first and second substrates 12 and 22 face each other, and the liquid crystal layer 30 is interposed therebetween.

The first substrate 12 includes a gate line 14, a data line 16, a TFT "Tr", and a pixel electrode 18, and so on. The gate line 14 and the data line 16 cross each other such that a region formed between the gate and data lines 14 and 16 is defined as a pixel region "P". The TFT "Tr" is formed at a crossing portion between the gate and data lines 14 and 16, and the pixel electrode 18 is formed in the pixel region "P" and connected to the TFT "Tr".

The second substrate 22 includes a black matrix 25, a color filter layer 26, and a common electrode 28. The black matrix 25 has a lattice shape to cover a non-display region of the first substrate 12, such as the gate line 14, the data line 16, the TFT "Tr", and so on. The color filter layer 26 includes first, second, and third sub-color filters 26a, 26b, and 26c. Each of the sub-color filters 26a, 26b, and 26c has one of red, green, and blue colors "R", "G", and "B" and corresponds to the each pixel region "P". The common electrode 28 is formed on the black matrix 25 and the color filter layers 26 and over an entire surface of the second substrate 22. As mentioned above, the arrangement of the liquid crystal molecules is controlled by an electric field between the pixel electrode 18 and the common electrode 28 such that an amount of transmitted light is changed. As a result, the LCD device displays images.

Though not shown in FIG. 1, to prevent the liquid crystal layer 30 being leaked, a seal pattern may be formed along edges of the first and second substrates 12 and 22. First and second alignment layers may be formed between the first substrate 12 and the liquid crystal layer 30 and between the second substrate 22 and the liquid crystal layer 30. Polarizer may be formed on at least an outer surface of the first and second substrates 12 and 22.

Moreover, the LCD device includes a backlight assembly on an outer surface of the first substrate 12 to supply light to the liquid crystal layer 30. When a scanning signal is applied to the gate line 14 to control the TFT "Tr", a data signal is applied to the pixel electrode 18 through the data line 16 such that the electric field is induced between the pixel and common electrodes 18 and 28. As a result, the LCD device produces images using the light from the backlight assembly.

Many mask processes, which may be referred to as a photolithography process, are performed in the fabricating the array substrate for the LCD device to form a gate line, a semiconductor layer, a data line and so on. For example, the mask process includes a step of forming a material layer, a step of forming a photoresist (PR) layer on the material layer, a step of exposing the PR layer using a mask, a step of developing the PR layer to form a PR pattern, a step of etching the material layer using the PR pattern as an etching mask to form a line, an electrode, a semiconductor layer, and so on. A PR material used for the PR layer is divided into a positive type and a negative type. In the positive type, an exposed portion is removed by the step of developing. In the negative type, an exposed portion remains by the step of developing. Generally, the positive type PR material is used for a fabricating process of the array substrate. The array substrate is fabricated through a four mask process or a five mask process. For example, a five mask process for an array substrate may include a first mask process of forming a gate electrode and a gate line; a second mask process of forming a semiconductor layer over the gate electrode; a third mask process of forming a data line, a source electrode and a drain electrode; a fourth mask process of forming a passivation layer having a contact hole exposing the drain electrode; and a fifth mask process of forming a pixel electrode connected to the drain electrode through the contact hole.

Since the array substrate is fabricated through a complicated mask process, a production yield decreases. Moreover, since fabrication time and cost increase, a competitiveness of product is weakened.

Figure 2:
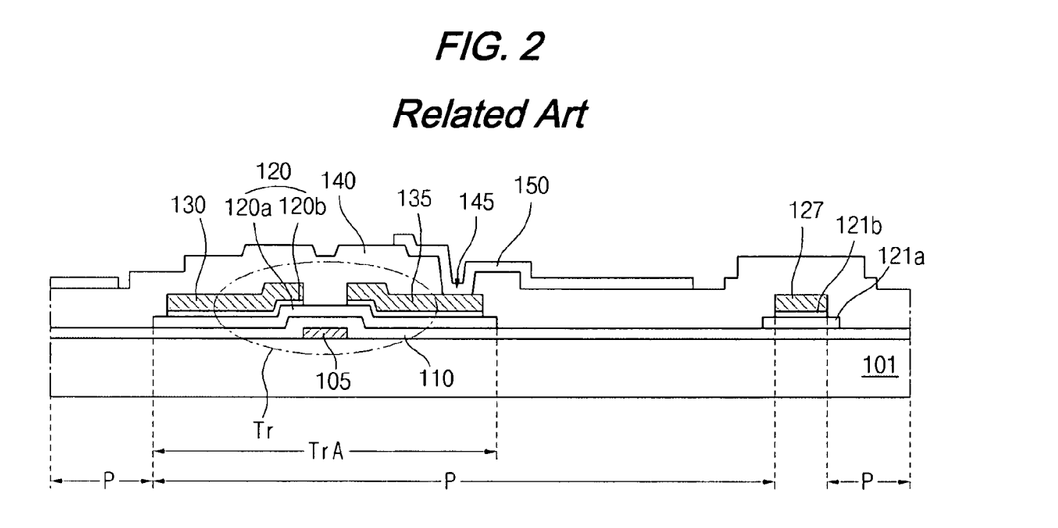
FIG. 2 is a cross-sectional view showing an array substrate for an LCD device fabricated through a 4 mask process.

Accordingly, the array substrate is fabricated through 4 mask process to increase production yield. FIG. 2 is a cross-sectional view showing an array substrate for an LCD device fabricated through a 4 mask process. As shown in FIG. 2, a first metal layer (not shown) is formed on a substrate 101 and is patterned using a first mask (not shown) to form a gate electrode 105 and a gate line (not shown). The gate electrode 105 is connected to the gate line (not shown). Next, a gate insulating layer 110, an intrinsic amorphous silicon layer (not shown), an impurity-doped amorphous silicon layer (not shown) and a second metal layer (not shown) are sequentially formed on the gate electrode (105) and the gate line (not shown). Then, the second metal layer (not shown), the impurity-doped amorphous silicon layer (not shown) and the intrinsic amorphous silicon layer (not shown) are patterned using a second mask (not shown) including one of a diffractive exposing mask and a half-tone mask to form a source electrode 130, a drain electrode 135, a data line 127 and a semiconductor layer 120 including an active layer 120a and an ohmic contact layer 120b. The half-tone mask includes a transmitting area, a blocking area and a half-transmitting area. The half-transmitting area has transmittance less than that of the transmitting area and greater than that of the blocking area. The source electrode 130 is connected to the data line 127 and spaced apart from the drain electrode 135. Next, a passivation layer 140 having a drain contact hole 145 is formed on the source electrode 130, the drain electrode 135 and the data line 127 using a third mask (not shown). The drain contact hole 145 exposes the drain electrode 135. Next, a pixel electrode connected to the drain electrode 135 through the drain contact hole 145 on the passivation layer 140 using a fourth mask (not shown).

However, there are some problems. Since the semiconductor layer 120, the source electrode 130, the drain electrode 135 and the data line 127 are formed at the same time, there are undesired patterns. Namely, a portion of the active layer 120a of the semiconductor layer 120 is not covered by the gate electrode 105 and is exposed to light from a backlight unit (not shown) under the substrate 101. Since the semiconductor layer 91 is formed of amorphous silicon, a photo leakage current is generated in the semiconductor layer 91 due to the light from the backlight unit. As a result, a property of the TFT T is degraded due to the photo leakage current.

Furthermore, an intrinsic amorphous silicon pattern 121a and an impurity-doped amorphous silicon pattern 121b are formed under the data line 127. The intrinsic amorphous silicon pattern 121a protrudes beyond the data line 127. The protruding portion of the intrinsic amorphous silicon pattern 121a is exposed to the light from the backlight unit or an ambient light. Since the intrinsic amorphous silicon pattern 121a is also formed of amorphous silicon, a light leakage current is generated in the intrinsic amorphous silicon pattern 121a. The light leakage current causes a coupling of signals in the data line 127 and the pixel electrode 150 to generate deterioration such as a wavy noise when displaying images. A black matrix (not shown) designed to cover the protruding portion of the intrinsic amorphous silicon pattern 121a reduces aperture ratio of the LCD device.

Moreover, there are shorting defects between the data line and the pixel electrode. In more detail, since the pixel electrode 150 is closest to the data line 127 to maximize aperture ratio, the shorting defects is generated between the data line 127 and the pixel electrode 150. It is caused by pattering error of the data line 127 and the pixel electrode 150 and the passivation layer 140 between the data line 127 and the pixel electrode 150. A repairing process is performed to overcome the shorting defects. For example, a contacting portion of the data line 127 and the pixel electrode 150 is cut using a laser. The repairing process increases fabricating time and decreases production yield.

SUMMARY OF THE INVENTION

Accordingly, the present invention is directed to an array substrate for an LCD device and a method of fabricating the same that substantially obviates one or more of the problems due to limitations and disadvantages of the related art.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, an array substrate for a liquid crystal display device comprises a gate line on a substrate having a pixel region; a gate insulating layer on the gate line; a data line crossing the gate line to define the pixel region and formed on the gate insulating layer; a thin film transistor in the pixel region and connected to the gate line and the data line; a passivation layer on the thin film transistor and the data line and having a groove extending along boundary portion of the pixel region and exposing the gate insulating layer; and a pixel electrode in the pixel region and connected to the thin film transistor.

In another aspect of the present invention, a method of fabricating an array substrate for a liquid crystal display device comprises forming a gate line and a gate electrode on a substrate having a pixel region; forming a gate insulating layer on the gate line and the gate electrode; forming an intrinsic amorphous silicon layer, an impurity-doped amorphous silicon layer and a conductive metal layer on the gate insulating layer; patterning the intrinsic amorphous silicon layer, the impurity-doped amorphous silicon layer and the conductive metal layer to form an active layer, an ohmic contact pattern, a conductive metal pattern and a data line, the active layer of intrinsic amorphous silicon disposed on the gate insulating layer and corresponding to the gate electrode, the ohmic contact pattern of impurity-doped amorphous silicon disposed on the active layer, the conductive metal pattern disposed on the ohmic contact pattern, and the data line connected to the conductive metal pattern and crossing the gate line to define the pixel region; forming a passivation layer having a drain contact hole on the conductive metal pattern the data line, the drain contact hole exposing a portion of the conductive metal pattern; forming a transparent conductive material layer on the passivation layer; and patterning the transparent conductive material layer, the passivation layer, the conductive metal pattern and the ohmic contact pattern to form a pixel electrode, a source electrode, a drain electrode, an ohmic contact layer and a groove, the pixel electrode from the transparent conductive material layer disposed in the pixel region and connected to the drain electrode, the source electrode from the conductive metal pattern connected the data line and spaced apart from the drain electrode, the ohmic contact layer from the ohmic contact pattern on the active layer, the groove extending along a boundary portion of the pixel region and exposing the gate insulating layer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the preferred embodiments, examples of which are illustrated in the accompanying drawings.

FIGS. 3A to 3D are plane views showing a process of fabricating an array substrate for an LCD device according to the present invention, and FIGS. 4A to 4I are cross-sectional views showing a process of fabricating a portion taken along the lines IV-IV of FIGS. 3A to 3D. FIGS. 4A to 4I show a switching region TrA where a TFT is formed.

Figure 3A:
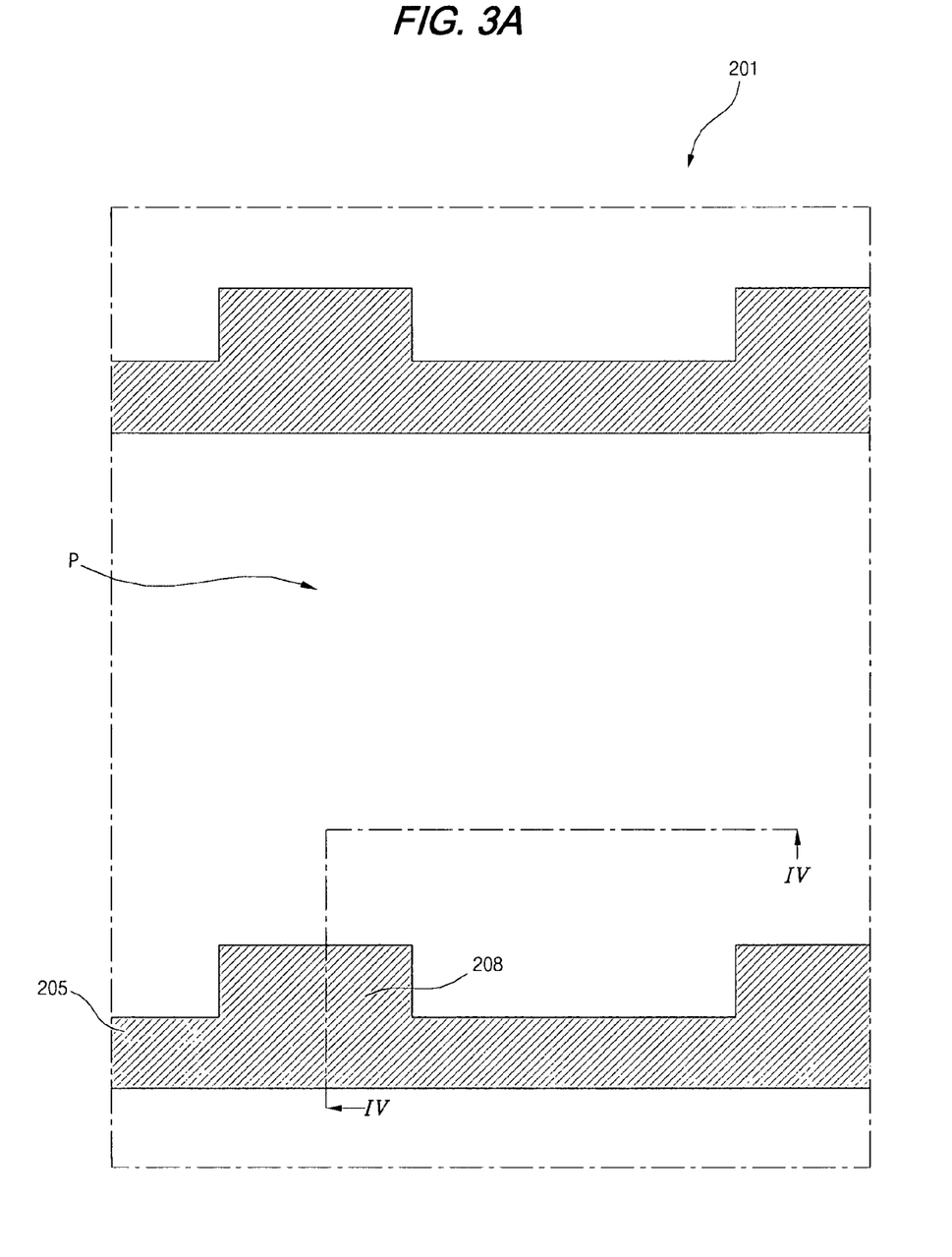
FIGS. 3A to 3D are plane views showing a process of fabricating an array substrate for an LCD device according to the present invention.
Figure 4A:
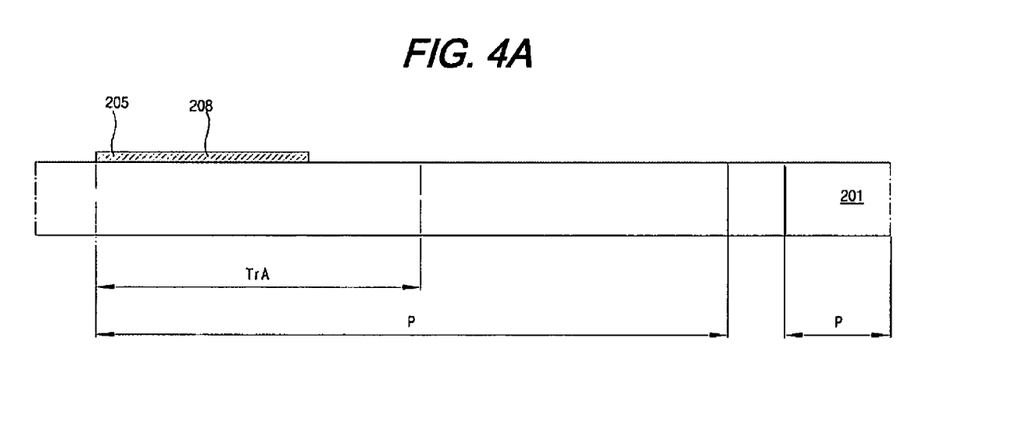
FIGS. 4A to 4I are cross-sectional views showing a process of fabricating a portion taken along the lines IV-IV of FIGS. 3A to 3D.

FIGS. 3A and 4A show a first mask process. As shown in FIGS. 3A and 4A, a first metal layer (not shown) is formed on a substrate 201 having a pixel region P. The first metal layer may include one of aluminum (Al), aluminum alloy (AlNd), copper (Cu), copper (Cu) alloy and molybdenum (Mo). Then, the first metal layer (not shown) is patterned through a first mask process to form a gate line 205 and a gate electrode 208. Although not shown, the first mask process, for example, includes a step of forming a first PR layer, a step of exposing the first PR layer using a first mask, a step of developing the first PR layer to form a first PR pattern, a step of etching the first metal layer using the first PR pattern as an etching mask, and a step of stripping the first PR pattern. The gate electrode 208 is connected to the gate line 205 and disposed in the switching region TrA. At the same time, a gate pad (not shown) disposed at one end of the gate line 205 is formed. The first metal layer may have a double-layered or a triple-layered structure. Each layer includes at least one conductive metallic material such as aluminum(Al),aluminum alloy(AlNd), copper(Cu), copper(Cu)alloy and Molybdenum(Mo).

Figure 3B:
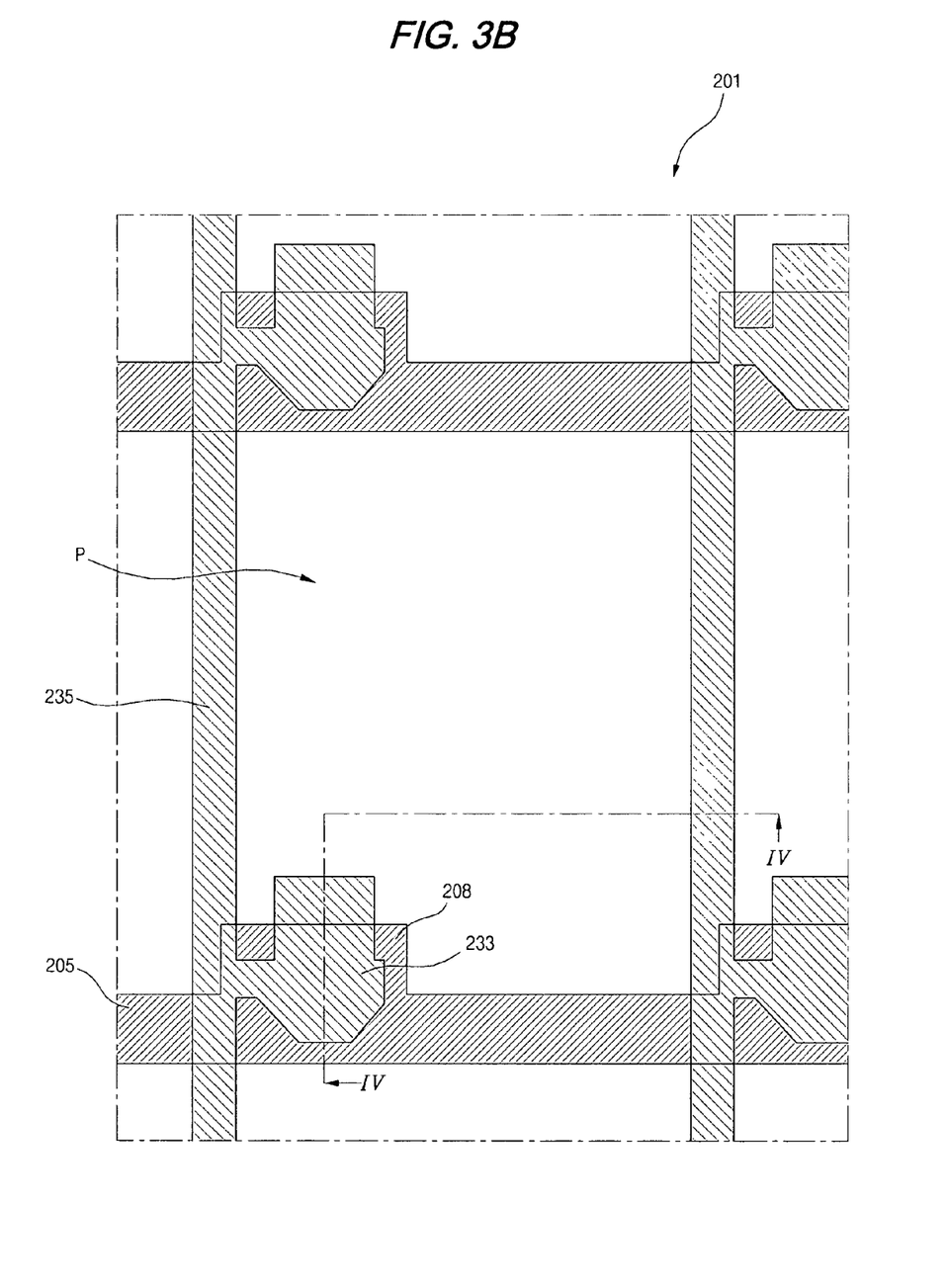
Figure 4B:
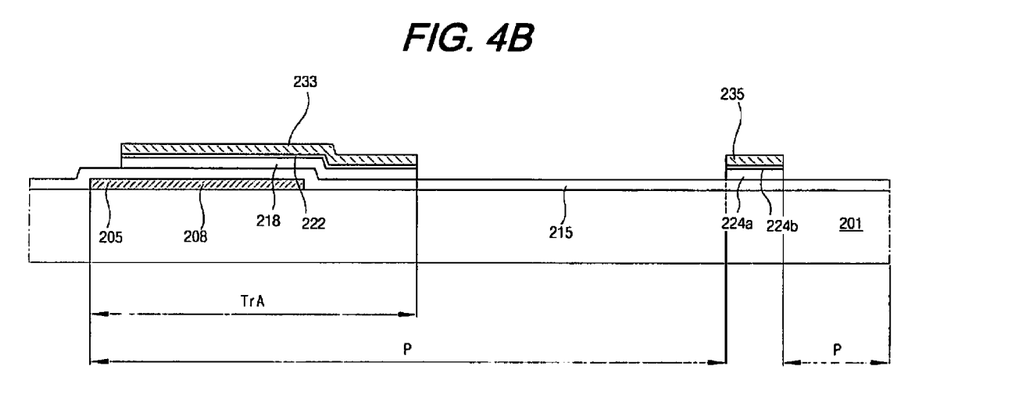

FIGS. 3B and 4B show a second mask process. As shown in FIGS. 3B and 4B, a gate insulating layer 215, an intrinsic amorphous silicon layer (not shown), an impurity-doped amorphous silicon layer (not shown) and a second metal layer (not shown) are sequentially formed on the gate line 205 and the gate electrode 208. The gate insulating layer 215 includes an inorganic insulating material such as silicon oxide ($SiO_2$) and silicon nitride (SiNx). The second metal layer (not shown) includes a conductive metallic material such as molybdenum (Mo) and chromium (Cr).

Then, a second PR layer (not shown) is formed on the second metal layer (not shown), and the second PR layer is exposed and developed using a second mask (not shown) to form a second PR pattern (not shown). The second metal layer (not shown) is exposed by the second PR pattern (not shown). The second mask (not shown) includes a transmitting area and a blocking area. The second mask (not shown) does not include a half-transmitting area. Next, the second metal layer (not shown) is pattered using the second PR pattern (not shown) as a pattering mask to form an active layer 218 of intrinsic amorphous silicon, an ohmic contact pattern 222 of impurity-doped amorphous silicon, a second metal pattern 233 and a data line 235. The data line 235 is connected to the second metal pattern 233 and crosses the gate line 205 to define the pixel region P. The active layer 218, the ohmic contact pattern 222, the second metal pattern 233 is disposed in the switching region TrA. Since the second metal layer (not shown), the impurity-doped amorphous silicon layer and the intrinsic amorphous silicon layer are patterned at the same time, an intrinsic amorphous silicon pattern 224a and an impurity-doped amorphous silicon pattern 224b are disposed under the data line 235. At the same time, a data pad (not shown) disposed at one end of the data line 235 is formed of the second metal layer.

Since the second metal layer, the impurity-doped amorphous silicon layer and the intrinsic amorphous silicon layer are patterned at the same time using the second mask, which do not have a half-transmitting area, End lines of the data line 235, the impurity-doped amorphous silicon pattern 224b and the intrinsic amorphous silicon pattern 224a are entirely overlapped. As a result, the intrinsic amorphous silicon pattern 224a does not protrude beyond the data line 235. Moreover, end lines of the second metal pattern 233, the ohmic contact pattern 222 and the active layer 218 are entirely overlapped. As a result, the active layer 218 does not beyond the second metal pattern 233.

The second PR pattern is removed by ashing or stripping.

Figure 3C:
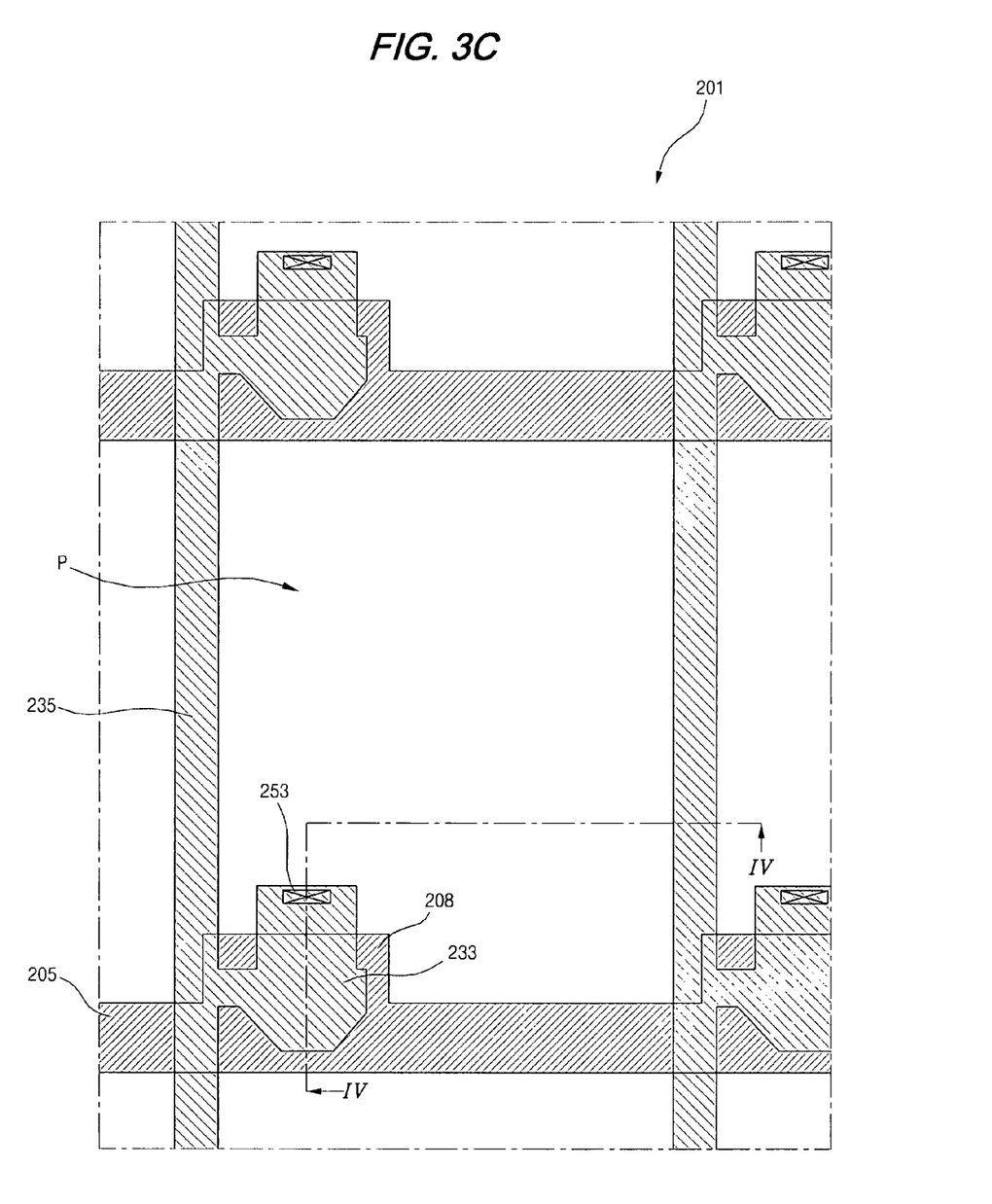
Figure 3D:
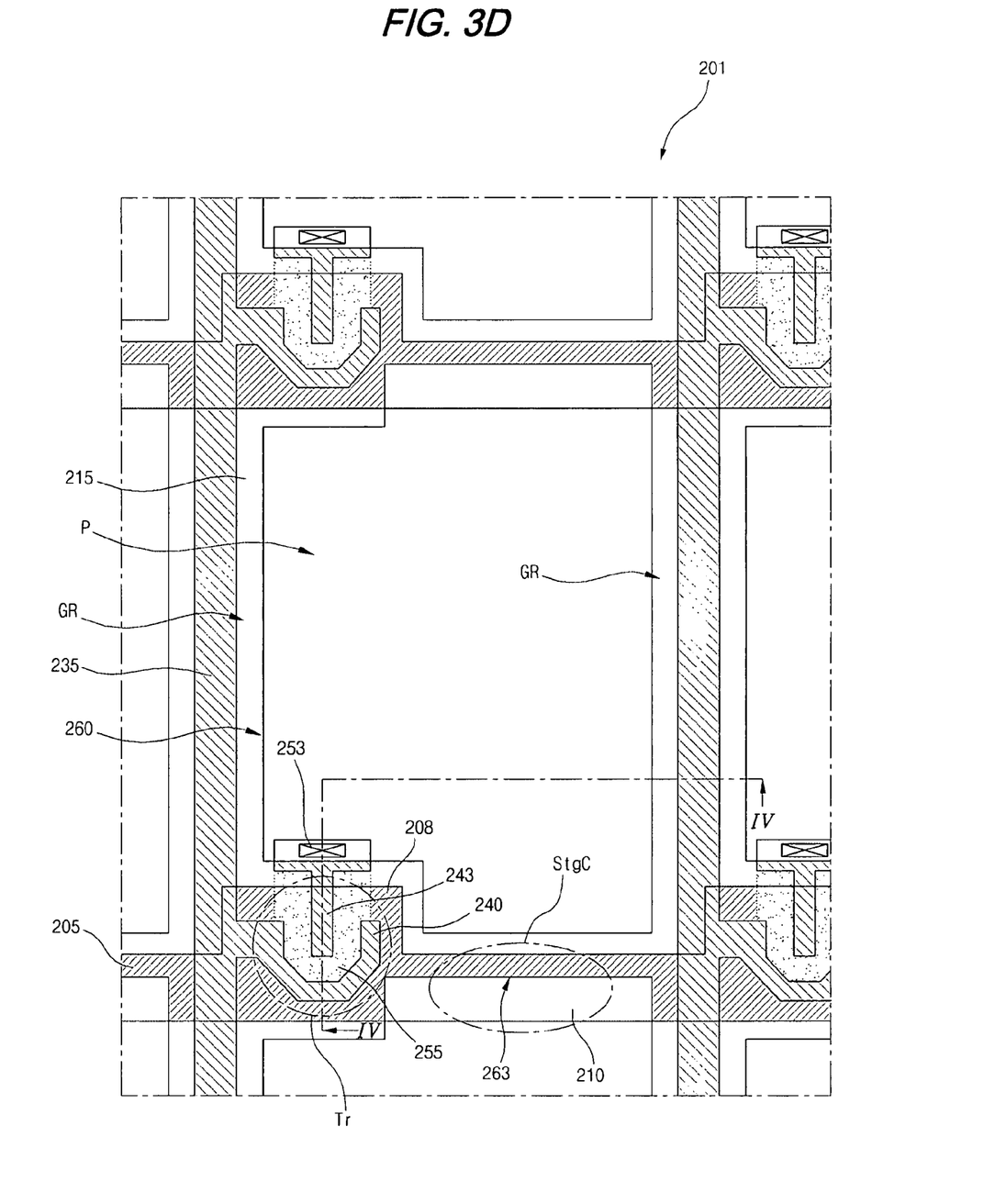
Figure 4C:
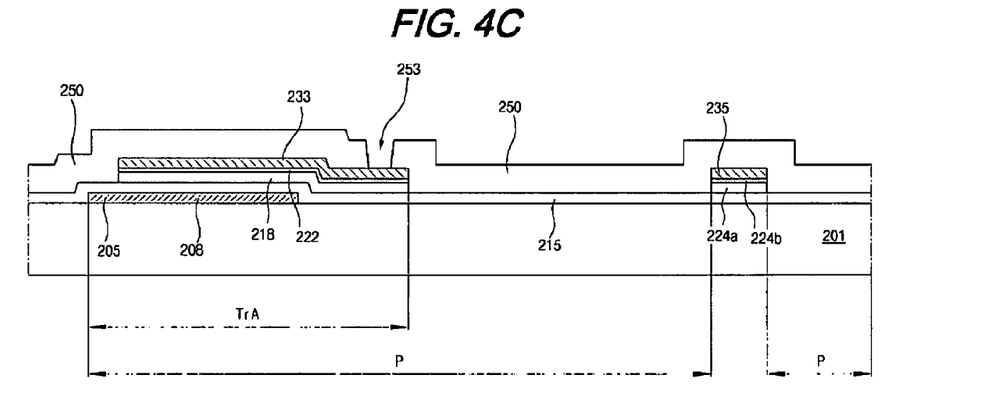

FIGS. 3C and 4C show a third mask process. As shown in FIGS. 3C and 4C, a passivation layer 250 is formed on the second metal pattern 233 by depositing an inorganic insulating material, such as silicon oxide ($SiO_2$) and silicon nitride (SiNx), or coating an organic insulating material, such as benzocyclobutene (BCB) and photo-acryl. The passivation layer 250 may includes a material different from a material of the gate insulating layer 215. Next, the passivation layer 250 is patterned using a third mask (not shown) to form a drain contact hole 253 exposing a portion of the second metal pattern 233. At the same time, although not shown, a gate pad contact hole exposing the gate pad and a data pad contact hole exposing the data pad are formed by pattering the passivation layer 250.

Figure 4D:
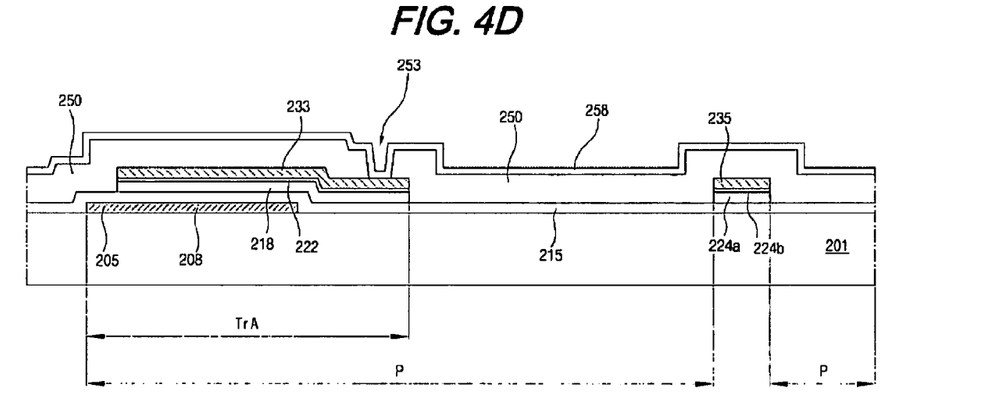

FIGS. 3D and 4D to 4I show a fourth mask process. First, as shown in FIG. 4D, a transparent conductive material layer 258 is formed on the passivation layer 250. The transparent conductive material layer 258 includes one of indium-tin-oxide (ITO) and indium-zinc-oxide (IZO). The transparent conductive material layer 258 is connected to the second metal pattern 233 through the drain contact hole 253. Although not shown, the transparent conductive material layer 258 contacts the gate pad and the data pad through the gate pad contact hole and the data pad contact hole, respectively.

Figure 4E:
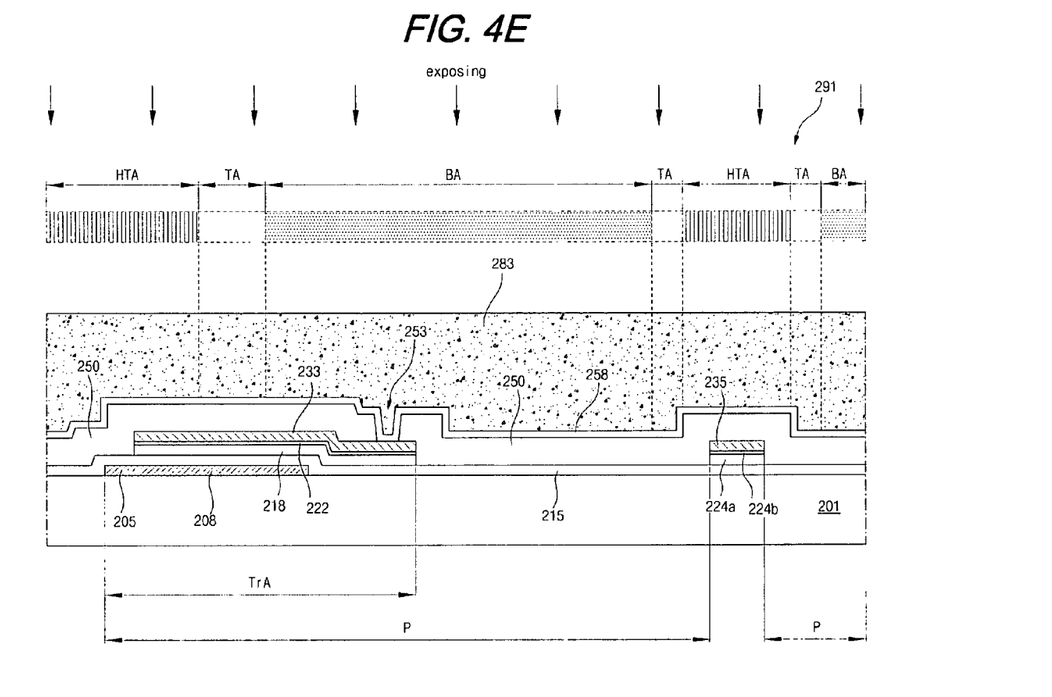

Next, as shown in FIG. 4E, a third PR layer 283 is formed on the transparent conductive material layer 258. A positive type PR material may be used for the third PR layer 283. A four mask 291 having a transmitting area TA, a blocking area BA and a half-transmitting area HTA is disposed over the third PR layer 283. The half-transmitting area HTA has transmittance less than that of the transmitting area TA and greater than that of the blocking area BA. The transmitting area TA has a relatively high transmittance, for example, about 100%, so that light through the transmitting area TA can completely change the third PR layer 283 chemically. The blocking area BA shields light completely. The half-transmitting area HTA has a slit structure or a half-transmitting film so that intensity or transmittance of light through the half-transmitting area HTA can be lowered. For example, the half-transmitting area HTA has transmittance with a range between about 10% and about 90%. The transmitting area TA corresponds to a substantially center portion of the gate electrode 208 in the switching region TrA and both sides of the data line 235. The blocking area BA corresponds to the pixel region P and one side of the transmitting area TA of the switching region TrA. Namely, the blocking area BA at one side of the transmitting area TA corresponds to the drain contact hole 253. The half-transmitting area HTA corresponds to the data line 235 and the other side of the transmitting area TA in the switching region TrA. Moreover, the blocking area BA corresponds to a portion of the gate line 205, where a storage capacitor StgC is to be formed. Furthermore, the blocking area BA corresponds to the gate pad (not shown) and the data pad (not shown). Then, the third PR layer 283 is exposed through the fourth mask 291.

Figure 4F:
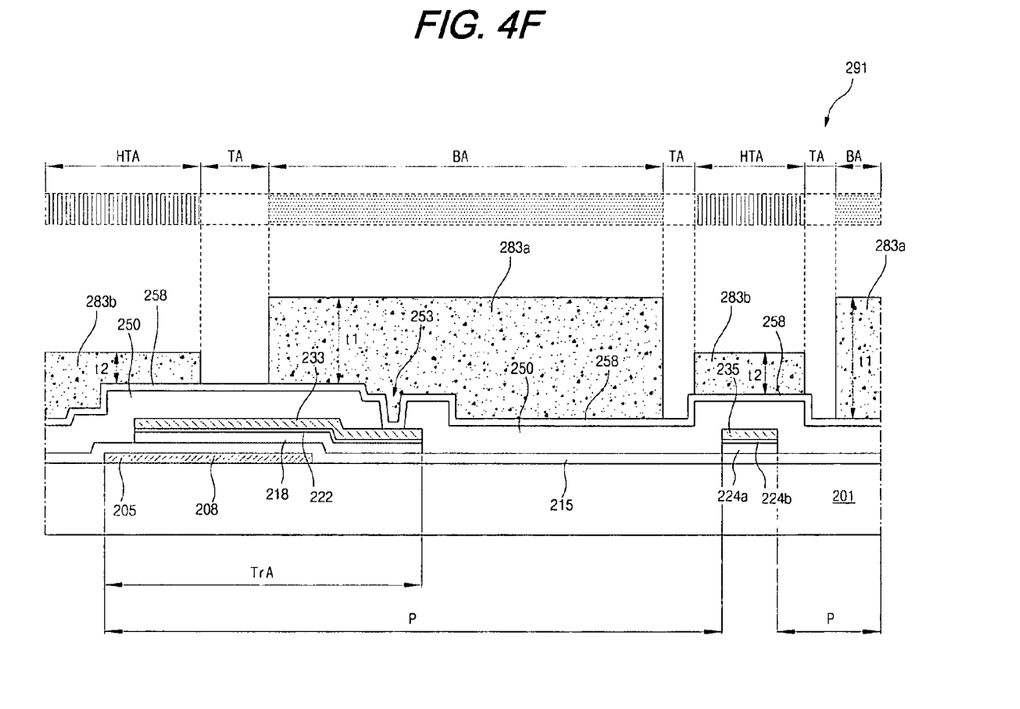

Next, as shown in FIG. 4F, the third PR layer 283 is developed to form third and fourth PR patterns 283a and 283b. The third PR pattern 283a corresponds to the blocking area BA and has a first thickness t1. The fourth PR pattern 283b corresponds to the half-transmitting area HTA and has a second thickness t2 less than the first thickness t1. Namely, the third PR pattern 283a corresponds to the pixel region P, the drain contact hole 253, the portion of the gate line 205, the gate pad (not shown) and the data pad (not shown). And, the fourth PR pattern 283b corresponds to the data line 235 and the other side of the switching region TrA. As a result, the transparent conductive material layer 258 in the substantially center portion of the gate electrode 208 and both sides of the data line 235 is exposed by the third and fourth PR patterns 283a and 283b.

Figure 4G:
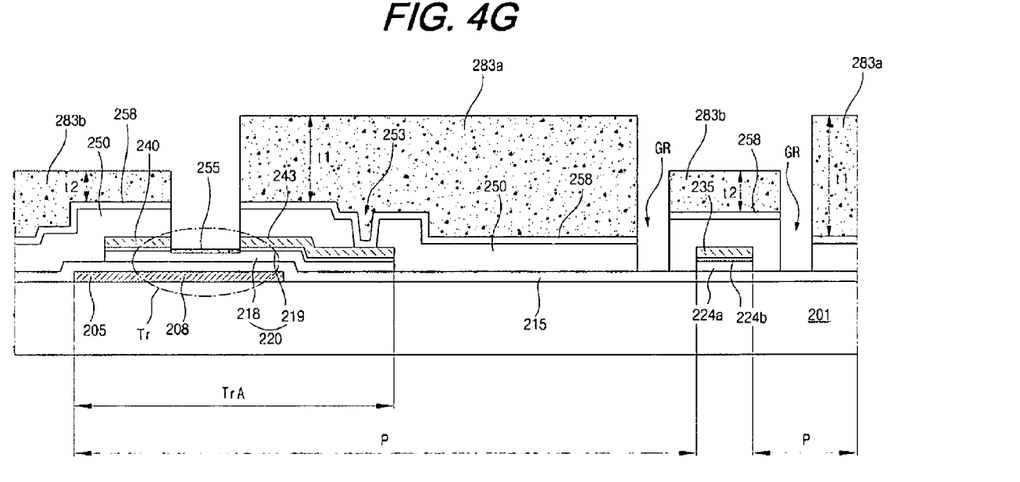

Next, as shown in FIG. 4G, the transparent conductive material layer 258 and the passivation layer 250 are patterned using the third and fourth PR patterns 283a and 283b as a patterning mask to expose the second metal pattern 233 (of FIG. 4F) in the switching region TrA and grooves GR at boundary portion of the pixel region P. The grooves GR may be formed at both sides of the data line 235. The gate insulating layer 215 is exposed through the grooves GR. Next, the second metal pattern 233 (of FIG. 4F) and the ohmic contact pattern 222 (of FIG. 4F) are patterned using the third and fourth PR patterns 283a and 283b as a patterning mask to form a source electrode 240, a drain electrode 243 and an ohmic contact layer 219. The source electrode 240 is connected to the data line 235 and spaced apart from the drain electrode 243. The ohmic contact layer 219 has divided two portions. Each portion of the ohmic contact layer 219 corresponds to the source electrode 240 and the drain electrode 243. The active layer 218 is exposed between the source and drain electrodes 240 and 243. The exposed active layer 218 is defined as a channel region. An oxidized silicon layer 255 is formed on the active layer 218 by heating or performing an O2 plasma process to protect the active layer 218. At this time, if the data line 235 protrudes beyond the passivation layer 250 by a patterning error, protruding portions are also etched with the second metal pattern 233 (of FIG. 4F).

Figure 4H:
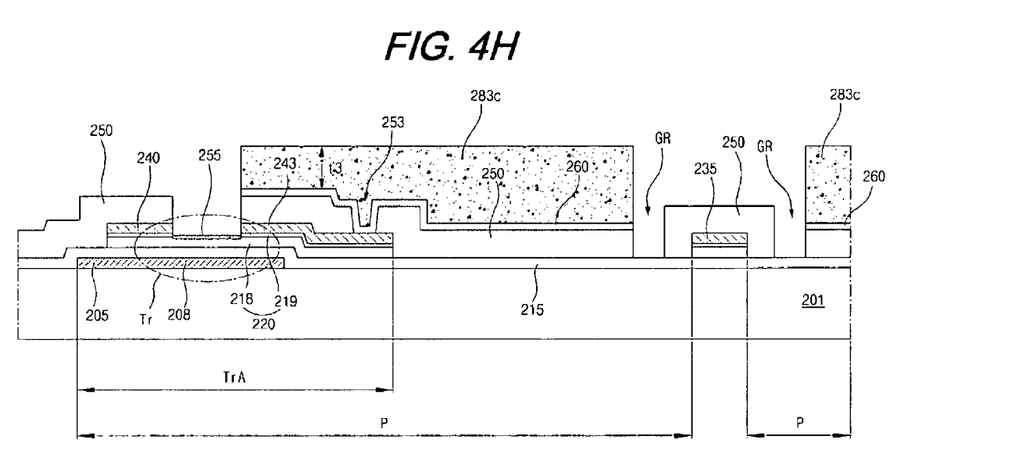

Next, as shown in FIG. 4H, the third and fourth PR patterns 283a and 283b are ashed to form a fifth PR pattern 283c having a third thickness t3. The third PR pattern 283a having the first thickness is partially removed to form the fifth PR pattern 283c. The fourth PR pattern 283b is completely removed to expose the transparent conductive material layer 258. Then, the transparent conductive material layer 258 is etched using the fifth PR pattern 283c as an etching mask to form a pixel electrode 260. The pixel electrode 260 is formed in the pixel region P by ashing the fifth PR pattern 283c and connected to the drain electrode 243 through the drain contact hole 253. The pixel electrode 260 overlaps the gate line 205 to form the storage capacitor StgC. An overlapped portion of the gate line 205 functions as a first storage electrode 210, an overlapped portion of the pixel electrode 260 functions as a second storage electrode 263, and the gate insulating layer 215 and the passivation layer 250 between the first and second storage electrodes 210 and 263 function as a dielectric material layer. The first storage electrode 210, the second storage electrode 263 and the dielectric material layer constitute the storage capacitor StgC. At the same time, a gate pad terminal (not shown) and a data pad terminal (not shown). The gate pad terminal (not shown) is disposed at one end of the gate line 205 and contacts the gate pad (not shown) through the gate pad contact hole (not shown). The data pad terminal (not shown) is disposed at one end of the data line 235 and contacts the data pad (not shown) through the data pad contact hole (not shown). At this time, if the transparent conductive material layer 258 (of FIG. 4F) protrudes beyond the passivation layer 250, the protruding portions of the transparent conductive material layer 258 (of FIG. 4F) are also etched when the pixel electrode 260 is formed.

Figure 4I:
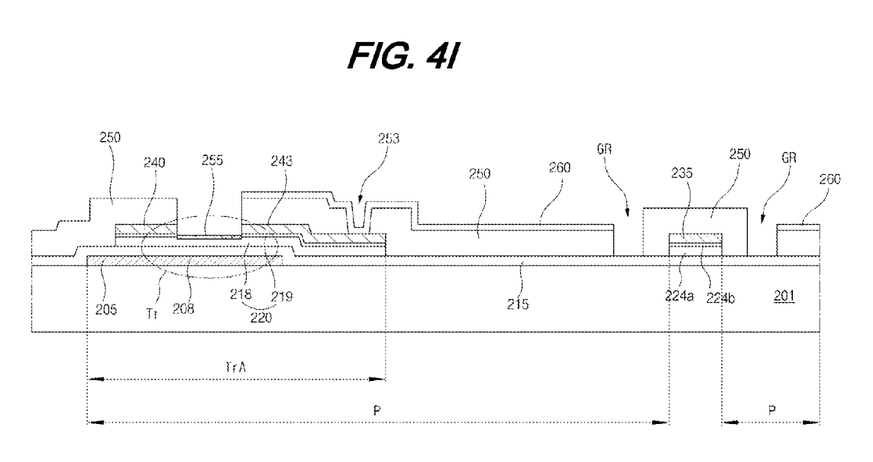

Next, as shown in FIG. 4I, the fifth PR pattern 283c is removed to fabricate the array substrate for the LCD device according to the present invention.

An array substrate for an LCD device according to the present invention, where a semiconductor layer is not formed under a data line, is fabricated through the above four mask process a wavy noise is prevented and aperture ratio is improved.

Moreover, since the data line and the pixel electrode are respectively etched twice, there are no shorting defects between the data line and the pixel electrode and the repairing process due to the shorting defects is not required. Accordingly, fabricating time decreases and production yield increases.

It will be apparent to those skilled in the art that various modifications and variations can be made in the organic electroluminescent device and fabricating method thereof of the present invention without departing from the spirit or scope of the invention. Thus, it is intended that the present invention cover the modifications and variations of this invention provided they come within the scope of the appended claims and their equivalents.

What is claimed is:

1. An array substrate for a liquid crystal display device, comprising:
   a gate line on a substrate having a pixel region;
   a gate insulating layer on the gate line;
   a data line crossing the gate line to define the pixel region and formed on the gate insulating layer;
   a thin film transistor in the pixel region and connected to the gate line and the data line;
   a passivation layer on the thin film transistor and the data line and having a groove extending along boundary portion of the pixel region and exposing the gate insulating layer; and
   a pixel electrode in the pixel region and connected to the thin film transistor,
   wherein the groove is positioned between the pixel electrode and the data line,
   wherein the groove includes first and second sub-grooves spaced apart from each other and respectively extending along the data line, and the pixel electrode is disposed between the first and second sub-grooves.

2. The array substrate according to claim 1, wherein end lines of the pixel electrode are coincident with end lines of the first and second sub-grooves, respectively.

3. The array substrate according to claim 1, wherein the groove is formed at both sides of the data line.

4. The array substrate according to claim 1, wherein the thin film transistor includes a gate electrode connected to the gate line, an active layer of intrinsic amorphous silicon over the gate electrode, an ohmic contact layer of impurity-doped amorphous silicon on the active layer, a source electrode connected to the data line and a drain electrode spaced apart from the source electrode, and the gate insulating layer is disposed between the gate electrode and the active layer.

5. The array substrate according to claim 4, wherein the passivation layer includes a drain contact hole exposing the drain electrode, and the pixel electrode is connected to the drain electrode through the drain contact hole.

6. The array substrate according to claim 4, wherein end lines of the source electrode and the semiconductor layer are coincident with each other, and end lines of the drain electrode and the semiconductor layer are coincident with each other.

7. The array substrate according to claim 4, wherein the passivation layer includes an active contact hole between the source and drain electrode, and the active layer is exposed through the active contact hole.

8. The array substrate according to claim 7, further comprising an oxidized silicon layer on the exposed active layer.

9. The array substrate according to claim 4, further comprising first and second silicon layers under the data line and having the same shape as the data line, wherein the first and second silicon layers are formed of the same layer and the same material as the active layer and the ohmic contact layer, respectively.

10. The array substrate according to claim 1, further comprising:
 a gate pad disposed at one end of the gate line;
 a data pad disposed at one end of the data line;
 a gate pad terminal contacting the gate pad and formed of the same layer and the same material as the pixel electrode; and
 a data pad terminal contacting the data pad and formed of the same layer and the same material as the pixel electrode.

11. The array substrate according to claim 1, wherein the pixel electrode overlaps the gate line to form a storage capacitor having an overlapped portion of the gate line as a first storage electrode, an overlapped portion of the pixel electrode as a second storage electrode, and the gate insulating layer and the passivation layer as a dielectric material layer.

* * * * *